United States Patent
Sethi et al.

(10) Patent No.: US 8,135,741 B2
(45) Date of Patent: Mar. 13, 2012

(54) MODIFYING SERVICE PROVIDER CONTEXT INFORMATION TO FACILITATE LOCATING INTERCEPTOR CONTEXT INFORMATION

(75) Inventors: Bhupinder S. Sethi, Redmond, WA (US); Sachin C. Sheth, Bothell, WA (US)

(73) Assignee: Microsoft Corporation, Redmond, CA (US)

( * ) Notice: Subject to any disclaimer, the term of this patent is extended or adjusted under 35 U.S.C. 154(b) by 1717 days.

(21) Appl. No.: 11/231,352

(22) Filed: Sep. 20, 2005

(65) Prior Publication Data

US 2007/0079007 A1 Apr. 5, 2007

(51) Int. Cl.
*G06F 7/00* (2006.01)
*G06F 17/30* (2006.01)

(52) U.S. Cl. ........................ 707/781; 709/203
(58) Field of Classification Search .................. None
See application file for complete search history.

(56) References Cited

U.S. PATENT DOCUMENTS

| | | | |
|---|---|---|---|
| 6,182,141 B1 | 1/2001 | Blum et al. | |
| 6,633,923 B1* | 10/2003 | Kukura et al. | 719/316 |
| 7,167,926 B1 | 1/2007 | Boucher et al. | |
| 7,178,150 B1* | 2/2007 | Ahmad et al. | 719/313 |
| 7,185,345 B2* | 2/2007 | Beaven et al. | 719/328 |
| 7,444,536 B1* | 10/2008 | Jairath | 714/4 |
| 2001/0023460 A1 | 9/2001 | Boucher et al. | |
| 2002/0009079 A1* | 1/2002 | Jungck et al. | 370/389 |
| 2002/0069282 A1* | 6/2002 | Reisman | 709/227 |
| 2003/0018808 A1* | 1/2003 | Brouk et al. | 709/238 |
| 2003/0120811 A1* | 6/2003 | Hanson et al. | 709/245 |
| 2003/0233544 A1 | 12/2003 | Erlingsson | |
| 2003/0236926 A1* | 12/2003 | Malville et al. | 709/328 |
| 2004/0015578 A1* | 1/2004 | Karakashian et al. | 709/223 |
| 2004/0030745 A1 | 2/2004 | Boucher et al. | |
| 2004/0039827 A1* | 2/2004 | Thomas et al. | 709/228 |
| 2004/0064503 A1* | 4/2004 | Karakashian et al. | 709/203 |
| 2004/0064578 A1 | 4/2004 | Boucher et al. | |
| 2004/0078480 A1 | 4/2004 | Boucher et al. | |
| 2004/0158640 A1* | 8/2004 | Philbrick et al. | 709/230 |
| 2005/0021863 A1* | 1/2005 | Jungck | 709/246 |
| 2005/0086282 A1* | 4/2005 | Anderson et al. | 709/200 |
| 2005/0166040 A1 | 7/2005 | Walmsley | |
| 2005/0172084 A1* | 8/2005 | Jeddeloh | 711/154 |
| 2005/0204058 A1 | 9/2005 | Philbrick et al. | |
| 2006/0075139 A1* | 4/2006 | Jungck | 709/245 |
| 2006/0098645 A1* | 5/2006 | Walkin | 370/389 |
| 2007/0150546 A1* | 6/2007 | Karakashian et al. | 709/207 |
| 2007/0226788 A1 | 9/2007 | Lee | |

(Continued)

OTHER PUBLICATIONS

U.S. Appl. No. 11/040,164, filed Jan. 19, 2005, Sheth et al.

(Continued)

*Primary Examiner* — Usmaan Saeed
(74) *Attorney, Agent, or Firm* — Perkins Coie LLP (57) ABSTRACT

A method and system for tracking context information of a service provider and interceptors of service provider requests is provided. An interceptor modifies a portion of service provider context information to reference interceptor context information associated with a client. When the client requests a service of the service provider, the client provides the modified service provider context information along with the request. The interceptor uses the reference of the modified portion of the service provider context information to retrieve its context information. The interceptor then restores the modified portion of the service provider context information to the original unmodified portion, which the interceptor retained as part of its context information. The interceptor then forwards the request along with the original service provider context information to the service provider.

15 Claims, 10 Drawing Sheets

U.S. PATENT DOCUMENTS

2008/0046714 A1    2/2008   Suganthi et al.

OTHER PUBLICATIONS

TDI Device Objects, Network Devices and Protocols: Windows DDK, Built on Nov. 23, 2004 (2 pages) Accessed Dec. 18, 2004 http://msdn.microsoft.com/library/en-us/network/hh/network/303tdi_bccb5f94-c589-4d2b-8579-1a0436.

TDI File Objects, Network Devices and Protocols: Windows DDK, Copyright 2004 Microsoft Corporation, Accessed Dec. 18, 2004 (1 page) http://msdn.microsoft.com/library/en-us/network/hh/network/303tdi_c465flee-4a08-4350-9973-e5f325b.

TDI Kernel-Mode Client Interactions, Network Devices and Protocols: Windows DDK, Copyright Microsoft Corporation, 2004, Built on Nov. 23, 2004, Accessed Dec. 18, 2004 (2 pages) http://msdn.microsoft.com/library/en-us/network/hh/network/303tdi_2288ad17-a27b-4c0f-9832-7d41e6.

TDI Requests Versus Events, Network Devices and Protocols: Windows DDK, Copyright Microsoft Corporation 2004, Built on Nov. 23, 2004, accessed Dec. 18, 2004 (1 page) http://msdn.microsoft.com/library/en-us/network/hh/network/303tdi_bcf6a688-0694-4767-ab3f-7a0ee1.

TDI Transport Driver Routines, Network Devices and Protocols: Windows DDK, Copyright Microsoft Corporation 2004, accessed Dec. 18, 2004 (1 page) http://msdn.microsoft.com/library/en-us/network/hh/network/303tdi_e01afe79-e6eb-452c-abbd-4d1f4a2.

TDI Transports and Their Clients, Network Devices and Protocols: Windows DDK, Copyright 2004 Microsoft Corporation, accessed Dec. 18, 2004 (1 page) http://msdn.microsoft.com/library/en-us/netowrk/hh/network/303tdi_ffb2fd6d-d03a-4dec-95af-fb9116e1.

TDI Transports and Their Clients, Network Devices and Protocols: Windows DDK, Copyright 2004 Microsoft Corporation, Built on Sep. 2, 2004, accessed Oct. 29, 2004 (1 page) http://msdn.microsoft.com/library/en-us/network/hh/network/303tdi_ffb2fd6d-d03a-4dec-95af-fb9116e1.

Transport Driver Interface, Network Devices and Protocols: Windows DDK, Copyright Microsoft Corporation 2004, Built on Nov. 23, 2004, Accessed Dec. 18, 2004 (2 pages) http://msdn.microsoft.com/library/en-us/network/hh/network/303tdi_af260005-f147-404f-8883-d4b6328.

"Architecting the Services Optical Network," Verma E L.Publication Date: Sep. 2001: Communication Magazine; vol. 39, issue 9, pp. 80-87.

* cited by examiner

MODIFYING SERVICE PROVIDER CONTEXT INFORMATION TO FACILITATE LOCATING INTERCEPTOR CONTEXT INFORMATION

BACKGROUND

Computer systems typically have services (e.g., file services) that are provided to clients (e.g., an application program). The services may implement a high-level service using low-level operations. For example, a file system may provide high-level commands to open and read files, which are implemented using low-level operations, such as sector seek and sector read. To access a file, an application program can request the file system to open the file and then read the file. The file system performs the necessary low-level operations to perform the high-level commands (e.g., open and read). Thus, the developer of an application program does not need to understand or use the low-level operations, but rather can rely on the file system for performing the appropriate low-level operations. The programs that request services of a service provider are referred to as clients. To have a service performed on its behalf, a client sends a request to a service provider of that service. The service provider performs the request and returns a result such as data or status information.

The requests for services can be satisfied synchronously or asynchronously by the service provider. When a request is satisfied synchronously, the client requesting the service waits until the service completes before continuing. For example, a client may request a service by invoking a read file function of a file system that returns after the file system has retrieved the data of the file. When a request is satisfied asynchronously, the client requesting the service does not wait until the service completes before continuing. However, when the service does complete, the service provider then notifies the client. For example, a client may request a service by invoking a read file function of the file system. That function may return immediately to the client so that the client can continue executing while the file system is reading the file. When the read completes, the service provider notifies the client, for example, by calling a callback function provided by the client or sending an event notification to the client.

One example of a client/service provider model is the Transport Device Interface ("TDI") of Microsoft Corporation. TDI defines the interactions between a "transport provider" that implements a transport layer and a "transport client" that uses the services of the transport provider. One example of a transport provider is a TCP driver, and one example of a transport client is a redirector of a file system. The redirector invokes functions provided by the TCP driver to send and receive messages via TCP. Thus, the redirector can access files stored on other computing devices using the services of the TCP driver.

A service provider may need to maintain state information for the client between requests received from the client. For example, when a file system opens a file on behalf of a client, the file system may need to maintain a file control block so that when the client requests to read from that file, it can locate the file control block needed to satisfy the request. Such information may be referred to as "context information." One technique for tracking context information is to return a handle to the client. The handle may be an operating system object that contains or references context information for a service provider session. A service provider session may be delimited by an open and a close request, such as an open file and a close file request. The service provider provides the handle to the client at the beginning of the session, and the client provides the handle to the service provider with each request. This allows the service provider to locate context information that is appropriate for the session. For example, the TDI model specifies that a WINDOWS file object is used as the handle for a TDI session.

Figure 1:
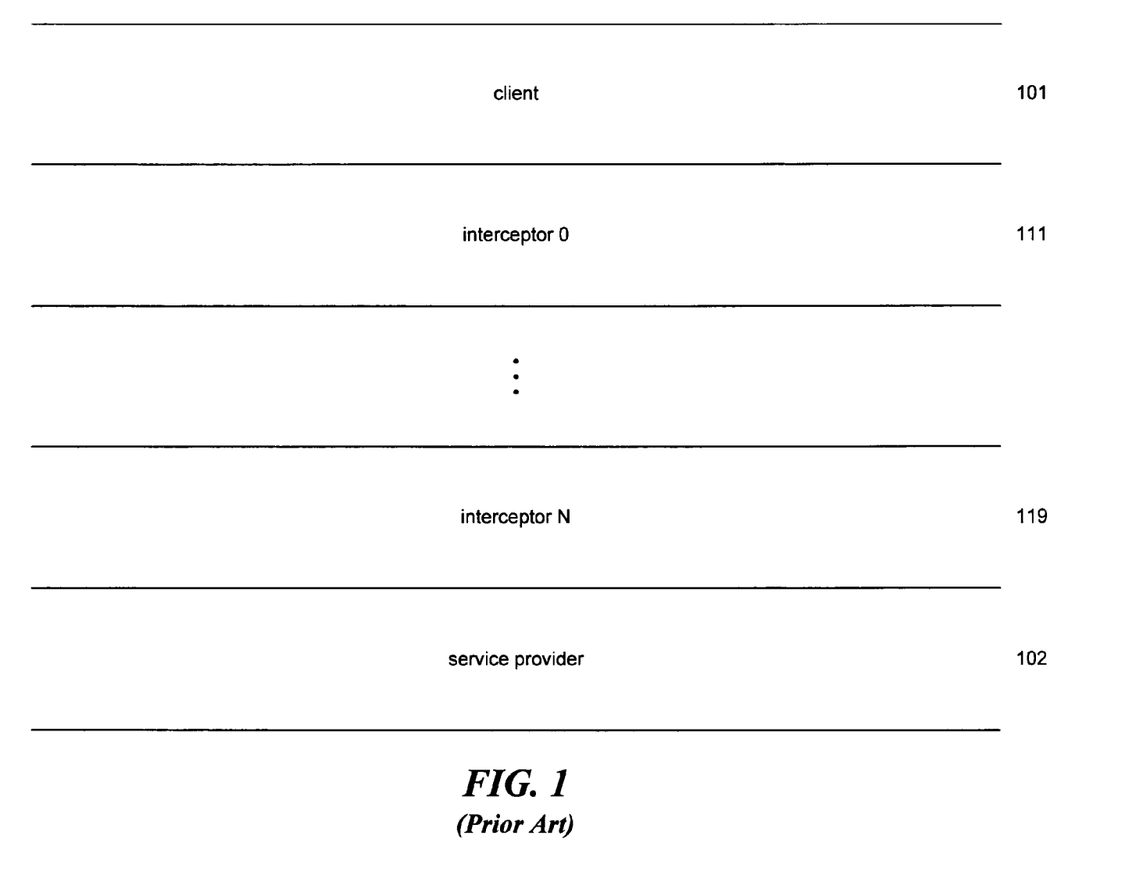
FIG. 1 is a diagram that illustrates the layered architecture of client, interceptors, and service provider.

It is often desirable to be able to extend the functions provided by a service provider. To support such extension, many systems allow for requests for services made by clients to a service provider to be intercepted or hooked. When a client makes a request to a service provider, an interceptor may receive the request and perform additional processing before forwarding the request to the service provider. The interceptor may also intercept the response to the request and perform additional processing before forwarding the response to the client. FIG. 1 is a diagram that illustrates the layered architecture of client, interceptors, and service provider. When client 101 wants to request services of the service provider 102, the client invokes a function, which may pass control to one or more interceptors 111-119. When each interceptor is invoked, it performs its processing and then forwards the invocation to the next lower level interceptor. Ultimately, the lowest level interceptor invokes a function of the service provider.

Figure 2:
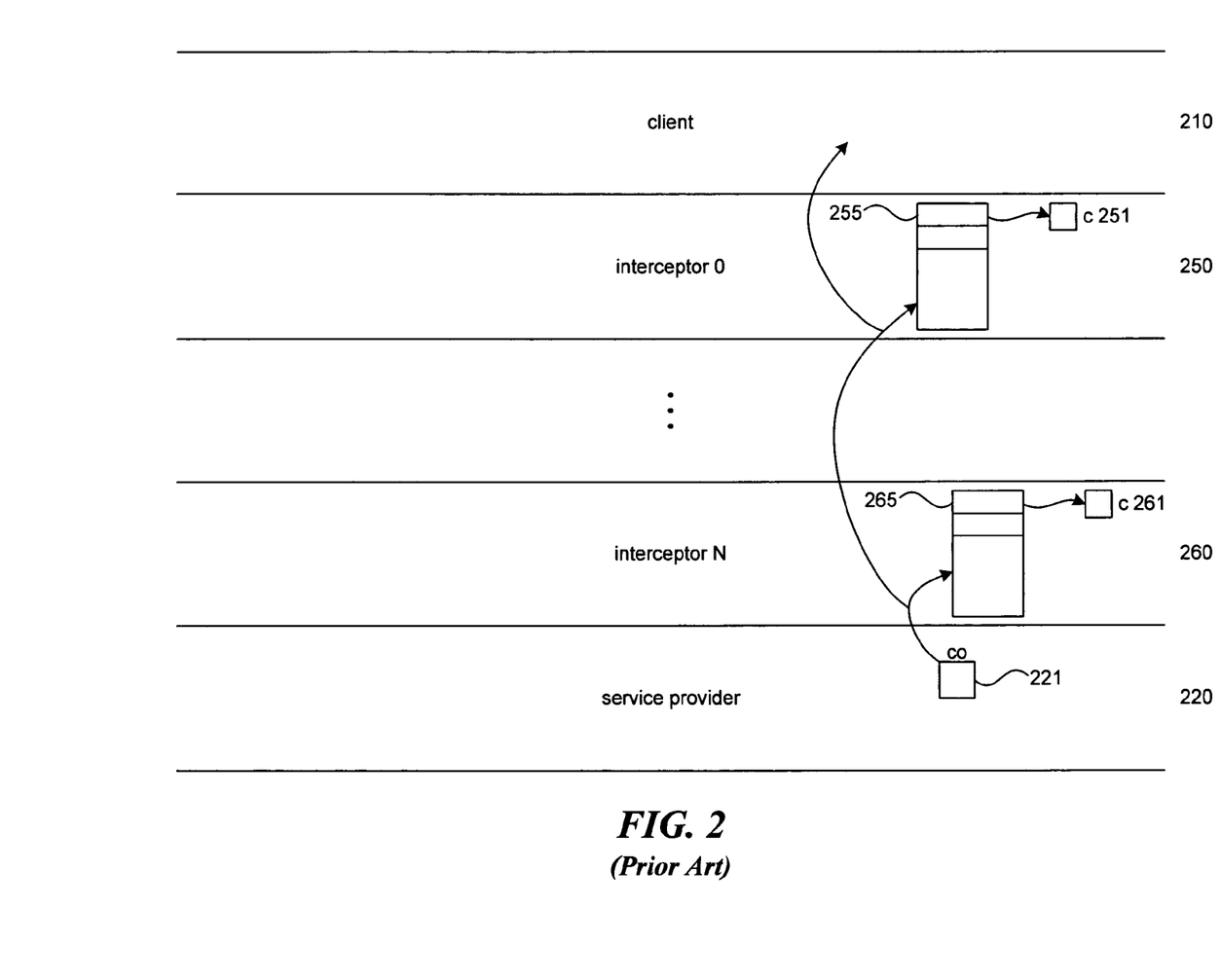
FIG. 2 is a diagram that illustrates one example of how interceptors track their context information.

Each interceptor, however, may need to maintain its context information. For example, an interceptor that simply logs to a file all invocations to a service provider during a session may have context information that includes the handle returned by the file system when the log file was opened or created. FIG. 2 is a diagram that illustrates one example of how interceptors track their context information. When client 210 requests a service of service provider 220, it is forwarded through interceptors 250 and 260 to the service provider. The service provider creates context information that is represented as a context object 221 (e.g., a file object). The service provider returns a reference to the context object to the lowest level interceptor, which forwards the references to the next higher level interceptor until the reference to the context object is eventually forwarded to the client. Each interceptor has its own context information 251 and 261. To track its context information, an interceptor may create a hash table 255 and 265 that contains references to its context information. The hash table is hashed based on the reference to the corresponding context object provided by the service. When the client makes another request of the service provider in the same service provider session, it includes the reference to the context object in its request. When an interceptor receives the request, the interceptor hashes the reference to locate its context information associated with that session. A difficulty with the use of a hash table by each interceptor is that there can be a high overhead in having to locate the appropriate context information for an interceptor.

Figure 3:
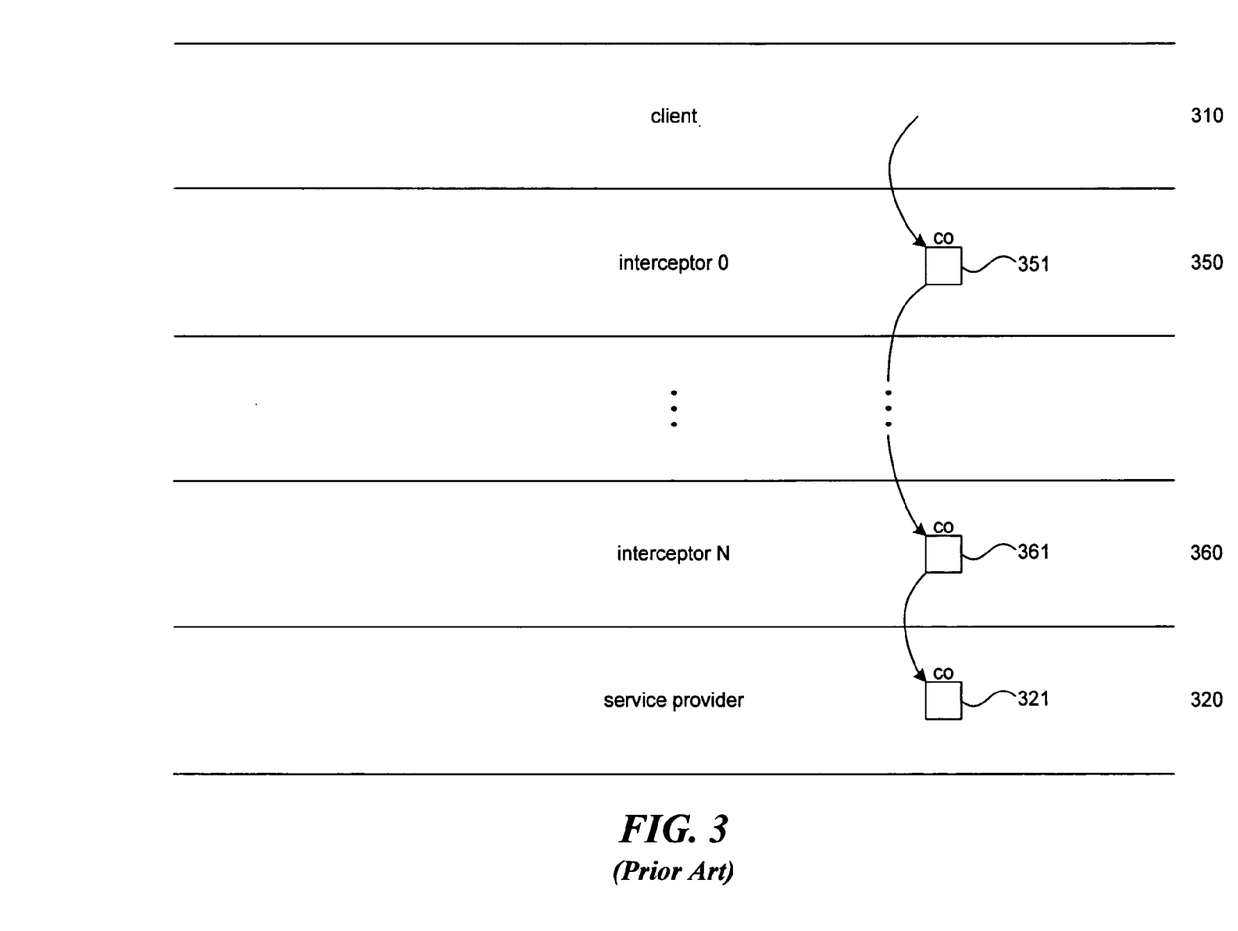
FIG. 3 is a diagram that illustrates another example of how interceptors track their context information.

FIG. 3 is a diagram that illustrates another example of how interceptors track their context information. In this example, service provider 320 creates context object 321 for a session of client 310. Each interceptor 350 and 360 also creates a context object 351 and 361. When the lowest level interceptor receives the response from the service provider, it replaces the reference to the context object of the service provider with a reference to its context object before forwarding the response to the next higher level interceptor. Eventually, the highest level interceptor forwards the response with a reference to its context object. Each interceptor includes as part of its context information the reference to the context object of the next lower layer. When the client requests a service of the service provider, it includes the reference provided by the highest-level interceptor, which is a reference to the context object for that interceptor. That interceptor uses the context information of the context object and then forwards the request to the next lower level interceptor using the reference provided by that next lower level interceptor. Eventually, the service provider receives a request that includes a reference to its context object. A difficulty with such an approach for tracking context information is that there can be a high overhead in creating context objects, especially if the creation of a context object requires a context switch from application mode to operating system mode.

SUMMARY

A method and system for tracking context information of a service provider and interceptors of service provider requests is provided. The context tracking system is implemented by an interceptor. The interceptor modifies a portion of service provider context information to reference interceptor context information associated with a client. The interceptor then provides the modified context information to the client that requested the service. When the client requests a service of the service provider, the client provides the modified service provider context information along with the request. Upon receiving the request from the client, the interceptor uses the reference of the modified portion of the service provider context information to retrieve its context information. The interceptor then restores the modified portion of the service provider context information to the original unmodified portion, which the interceptor retained as part of its context information. The interceptor then forwards the request along with the original service provider context information to the service provider.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and system for tracking context information of a service provider and interceptors of service provider requests is provided. In one embodiment, the context tracking system is implemented by an interceptor. The interceptor modifies a portion of service provider context information to reference interceptor context information associated with a client. For example, when an interceptor receives a service provider context object (e.g., a file object), the interceptor replaces certain information of the context object with a reference to context information of the interceptor. The interceptor then provides the modified context information to the client that requested the service. When the client requests a service of the service provider, the client provides the modified service provider context information along with the request. Upon receiving the request from the client, the interceptor uses the reference of the modified portion of the service provider context information to retrieve its context information. The interceptor then restores the modified portion of the service provider context information to the original unmodified portion, which the interceptor retained as part of its context information. The interceptor then forwards the request along with the original service provider context information to the service provider. In this way, the interceptor can track its context information for the client without the overhead of having to look up the context information and of having to create additional context objects.

In one embodiment, the context tracking system is implemented by multiple interceptors that are layered between a client and a service provider. A client initiates a session with a service provider by sending a request to the service provider, which is first intercepted by the interceptor at the highest level. That interceptor forwards the request to the next lower level interceptor. Eventually, the lowest level interceptor receives the request, performs the requested service, and sends a response to the client that includes service provider context information, which is first intercepted by the lowest level interceptor. Upon receiving the response, the lowest level interceptor replaces a portion of the service provider context information with a reference to its context information, saves the portion before modification for later restoration, and forwards the response along with the modified service provider context information to the interceptor at the next higher layer. When the interceptor at the next higher layer receives the response with the modified service provider context information, it also replaces a portion of a service provider context with a reference to its context information, saves the portion before modification (which in this case is a reference to context information of the interceptor at the next lower layer) for later restoration, and forwards the response along with the newly modified service provider context information to the interceptor at the next higher layer. Eventually, the client receives the response with the modified service provider context information which contains a reference to the context information of the interceptor at the highest level.

When the client next requests a service from the service provider as part of the same session, the client sends a request to the service provider that includes the modified service provider information, which is first intercepted by the interceptor at the highest level. That interceptor uses the reference of the modified portion of the modified service provider information to retrieve its context information. That interceptor then replaces the portion of the service provider information that it previously modified with the unmodified portion that it retained and forwards the request along with the restored service provider context information, which is then intercepted by the interceptor at the next lower level. That next lower level interceptor uses the reference of the restored portion of the service provider context information to locate its context information. That interceptor then restores the portion of the service provider context information that it previously modified with the retained portion and then forwards the request along with the restored service provider context information to the interceptor at the next lower level. Eventually, the service provider receives from the interceptor of the lowest level that request along with the service provider context information restored to the original service provider context information. The service provider then services the request using the service provider context information without having to know that the request had been intercepted and the service provider context information had been modified by various interceptors.

In one embodiment, a client during a single session may request a service of a service provider before a previous request has been completed; that is, the previous request is still outstanding. For example, if the requests are serviced synchronously, then one thread of the client may send a request by invoking a function, and before that invoked function returns, another thread of the client may send a request by again invoking that function. If the requests are serviced asynchronously, then a thread of the client may send a request, and before the response is received asynchronously (e.g., by invocation of a callback function), the client (on the same or a different thread) may send another request. Whenever a client sends a request during a session while another request of that session is outstanding, the service provider context information is considered currently in use by the previous request and the modified portion may be in an unknown state. For example, the modified portion may contain the original unmodified content, content newly modified by the service provider as part of servicing the outstanding request, content modified by the interceptors as the response from the service provider is intercepted, and so on. Thus, an interceptor cannot modify the service provider context information without risk of overwriting content needed by the service provider or an interceptor in processing the outstanding request.

To prevent an interceptor from overwriting content needed by the service provider or another interceptor processing an outstanding request, an interceptor reverts to a conventional technique of looking up its context information based on the reference to service provider context information. When an interceptor receives a request, it determines whether a modified portion of the service provider context information contains a reference to its context information. If not, the interceptor knows that the service provider or another interceptor is processing another outstanding request. The interceptor may store a unique identifier of itself when it modifies service provider context information. If that unique identifier has been changed, then the interceptor knows that the service provider or another interceptor is processing an outstanding request. In an alternative embodiment, an interceptor may use a reference counting technique to determine whether there is an outstanding request. If a request is outstanding, then the interceptor uses the reference (e.g., pointer to or address of) to the service provider context information to locate the interceptor's context information. For example, the interceptor may use a conventional hash table data structure to locate its context information. The interceptor then performs the processing of the request and forwards the request to the interceptor at the next lower level without modifying the service provider context information. The interceptor at the next lower level again detects that a unique identifier has been changed and looks up its context information using a conventional technique. Eventually, the interceptor at the lowest level forwards the request to the service provider without modifying the service provider context information. The service provider can then process the request with the server provider context information that it expects. In this way, the interceptors can service requests issued without having to look up their context information so long as there is no outstanding request. If requests are seldom issued with outstanding requests, then the context tracking system may provide significant performance improvements over conventional techniques.

Figure 4:
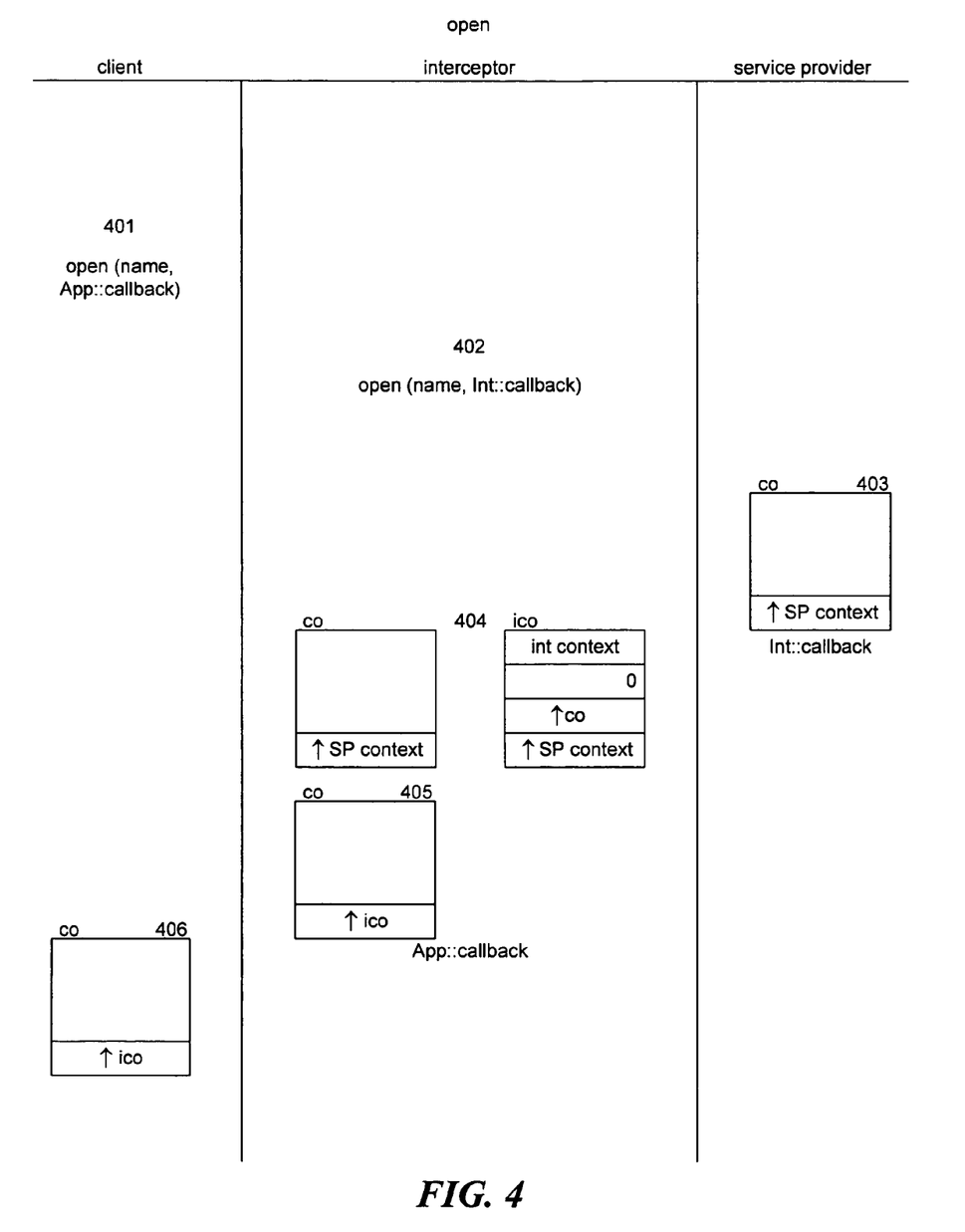
FIG. 4 is a diagram that illustrates modification of service provider context information when a session is initiated.
Figure 5:
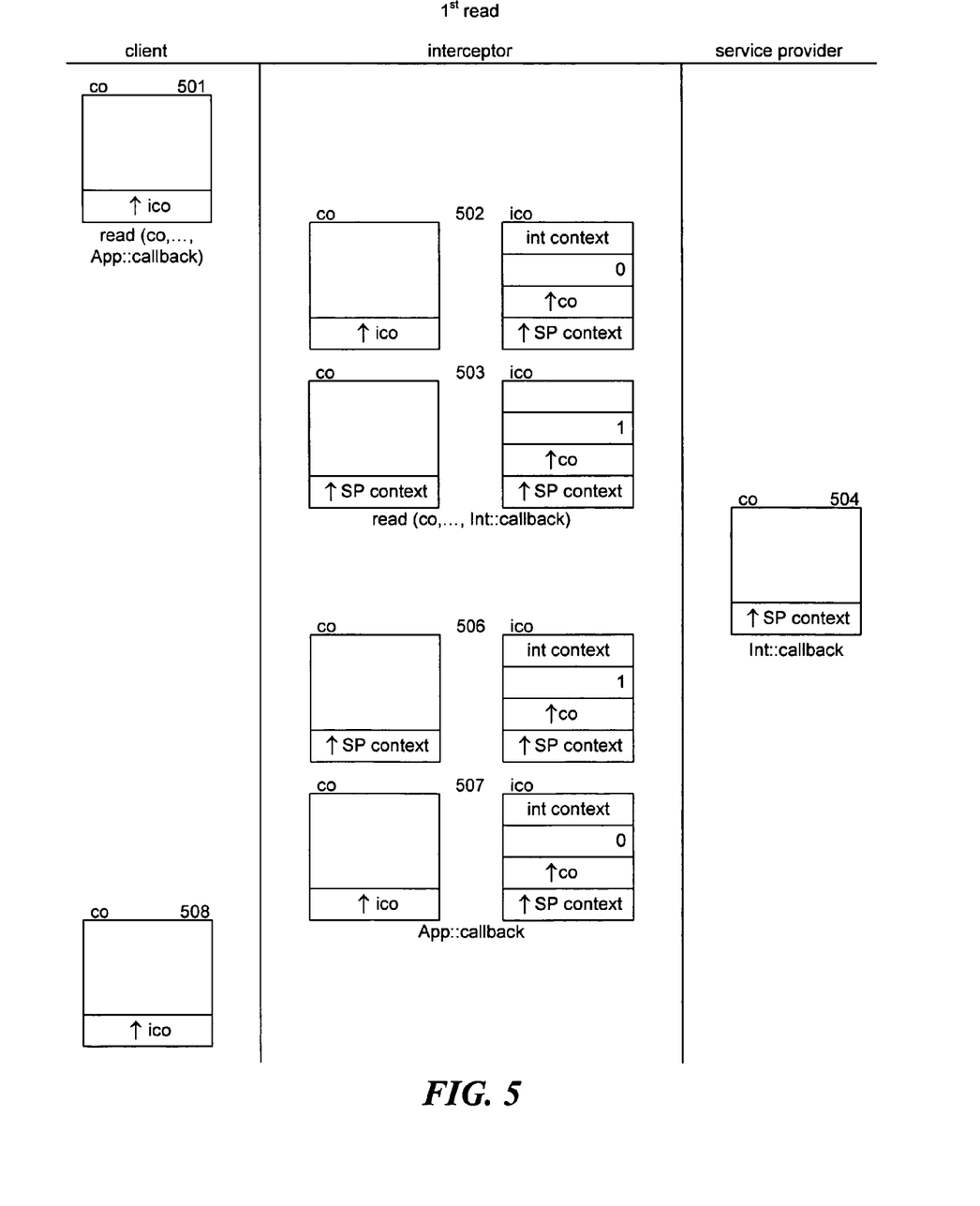
FIG. 5 is a diagram that illustrates restoration and modification of service provider context information when a service is requested during a session.
Figure 6:
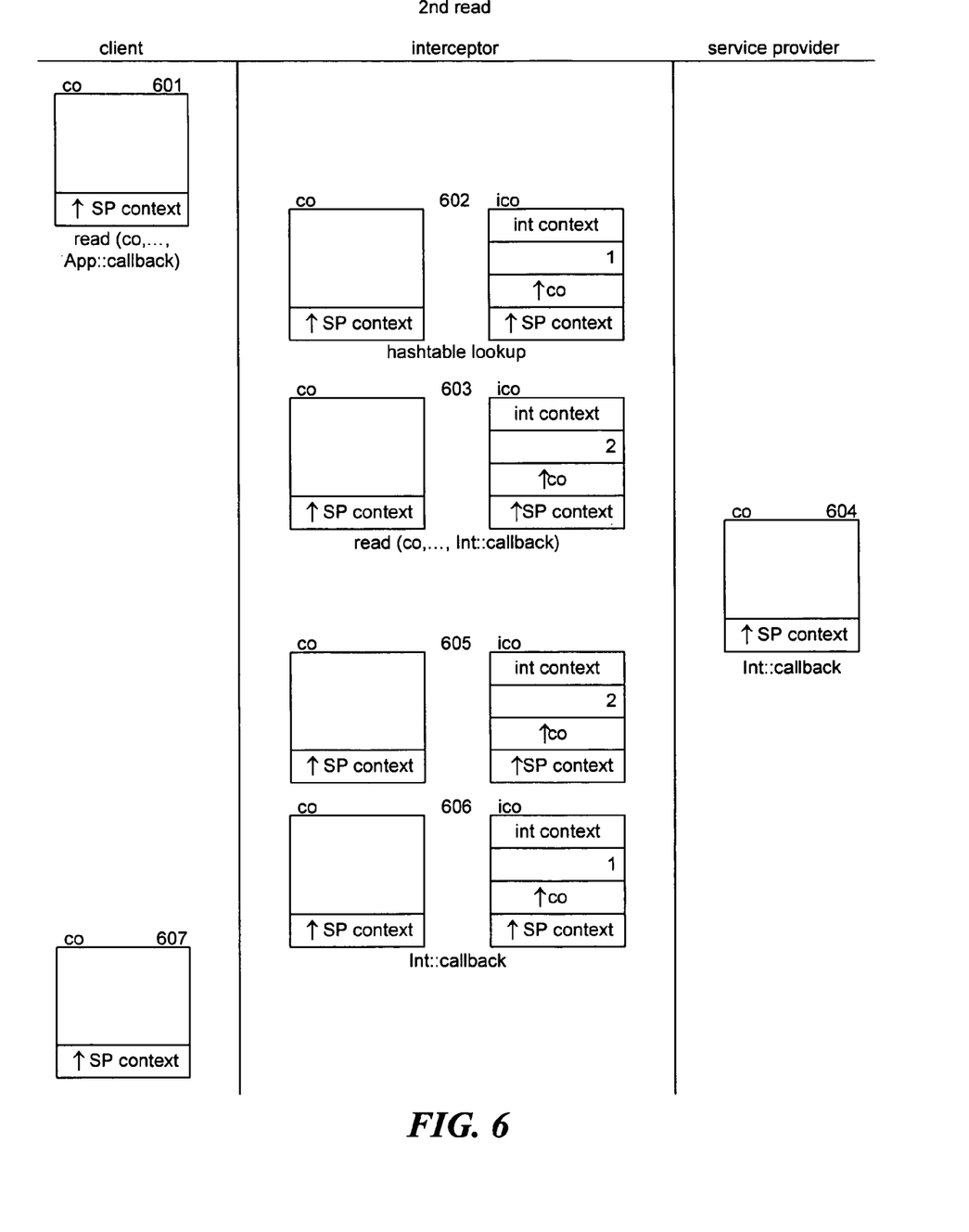
FIG. 6 is a diagram that illustrates no modification of service provider context information when a request is issued while another request is outstanding.

FIG. 4-6 are diagrams that illustrate an example of the modification and restoration of server provider context information in one embodiment. In this example, only one interceptor is between the client and the service provider. FIG. 4 is a diagram that illustrates modification of service provider context information when a session is initiated. Initially, a client issues 401 an open request that identifies a callback function (e.g., app::callback). The interceptor receives the request and forwards 402 the open request with its own callback function (e.g., int::callback) to the service provider. The service provider performs its services and when complete responds 403 to that request by invoking the callback function provided by the interceptor. The service provider passes a reference to a context object (i.e., "co") that includes its context information. Upon receiving that response, the interceptor creates 404 an interceptor context object (i.e., "ico"), which may be created locally by the interceptor to avoid the overhead of a context switch. An interceptor context object may contain a reference to the interceptor context information field, a count field, a context object pointer field, and a retained service provider context information field. The interceptor context information field contains either a reference to or the interceptor context information itself. The count field contains a count of the number of outstanding requests. Rather than using its unique identifier to identify whether a request is outstanding, an interceptor may use the count field. The interceptor increments the count field for each request it processes and decrements the count field for each response it processes. A count of zero means that no request is outstanding. The context object pointer field contains a pointer to the context object returned by the service provider, which may be used to resolve hash collisions when a request is outstanding. The retained service provider context information field contains a copy of the portion of the service provider context information to be modified so that it can be restored when a request is processed. The interceptor then modifies 405 a portion of the context object to reference the interceptor context object. The interceptor then invokes the callback function provided by the client to respond to the service request. When the client receives 406 the response, it stores a reference to the context object for use in requesting services during the same session.

FIG. 5 is a diagram that illustrates restoration and modification of service provider context information when a service is requested during a session. The client sends 501 a read request that includes the reference to the context object and identifies a callback function. Upon receiving the request, the interceptor retrieves 502 a reference to the interceptor context object from the received context object. The interceptor then restores 503 the context object using the content retained in the interceptor context object and increments the count of outstanding requests. The interceptor then forwards the request with the context object and a callback function to the service provider. The service provider performs 504 its processing and then responds by invoking the callback function of the interceptor and providing a reference to the context object. Upon receiving the response, the interceptor retrieves 506 the interceptor context object associated with the callback function. The interceptor may use different entry points of a callback function to identify the appropriate interceptor context object that is associated with that response. Alternatively, the interceptor may perform conventional lookup techniques for locating interceptor context information. The interceptor then modifies 507 the context object to point to the interceptor context object, decrements the count of outstanding requests, and forwards the response by invoking the callback function of the client. Upon receiving the response, the client stores 508 a reference to the context object.

FIG. 6 is a diagram that illustrates no modification of service provider context information when a request is issued while another request is outstanding. The client sends 601 a request that identifies the context object. In this example, the context object contains a reference to service provider context information, rather than interceptor context information. When processing the outstanding request, the interceptor restored the context object by overwriting the reference to the interceptor context object with the retained content. Upon receiving the next request, the interceptor detects 602 that a request is outstanding either by checking for its unique identifier in the modified portion of the context object or by determining that the count field of the interceptor context object is greater than zero. The interceptor then locates the interceptor context object using the reference to the context object and the hash table. Upon locating the interceptor context object, the interceptor increments 603 the count field to indicate that two requests are outstanding and forwards the request to the service provider without modifying the context object. The service provider performs 604 its processing and then responds by invoking the callback function provided by the interceptor. Upon receiving the response, the interceptor identifies 605 the appropriate interceptor context object and decrements 606 the field count. The interceptor then invokes the callback function of the client without modifying the context object. The client maintains 607 a reference to the context object for issuing the next request. The context object contains the unmodified service provider context information.

Figure 7:
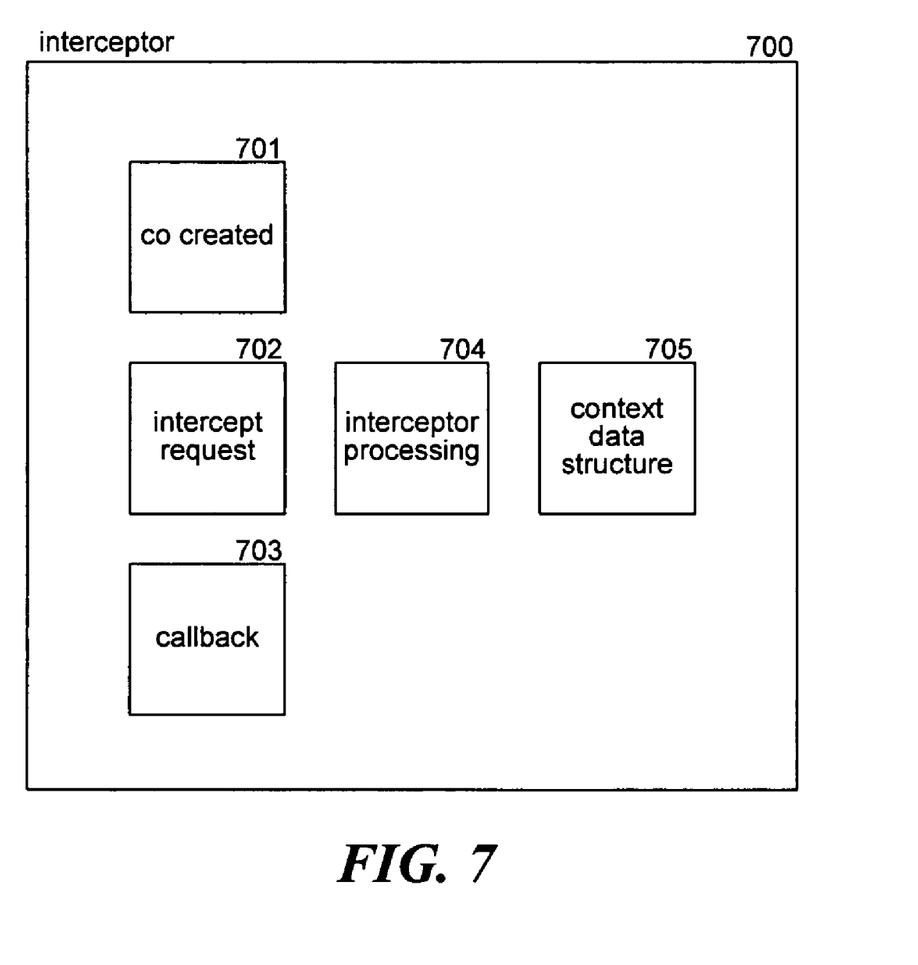
FIG. 7 is a block diagram that illustrates components of the context tracking system in one embodiment.

FIG. 7 is a block diagram that illustrates components of the context tracking system in one embodiment. The context tracking system is implemented by interceptors of client requests and service provider responses. An interceptor 700 that implements the context tracking system includes a context object created component 701, an intercept request component 702, a callback component 703, an interceptor processing component 704, and a context data structure 705. The context object created component is invoked by the interceptor when a context object is provided by the service provider when a session is created. The intercept request component is invoked by the interceptor when a request for service is intercepted. The intercept request component restores the service provider context information as appropriate. The callback component, which intercepts responses, is invoked when a response is provided by a service provider. The callback component modifies and retains the service provider context information as appropriate. The interceptor processing component performs the main processing function of the interceptor. The context data structure, which may be a hash table, a binary tree, or other data structure, is used to locate interceptor context information when multiple requests are outstanding. The interceptor may also use the context data structure defined in context information when a response is received to locate the interceptor context information.

The computing devices on which the context tracking system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the context tracking system.

The context tracking system may be implemented in various operating environments that include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. The context tracking system may also be implemented on computing devices such as cell phones, personal digital assistants, consumer electronics, home automation devices, and so on. The computing devices may communicate using various communications links, such as the Internet, a local area network, a wide area network, or a point-to-point dial-up connection.

The context tracking system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 8:
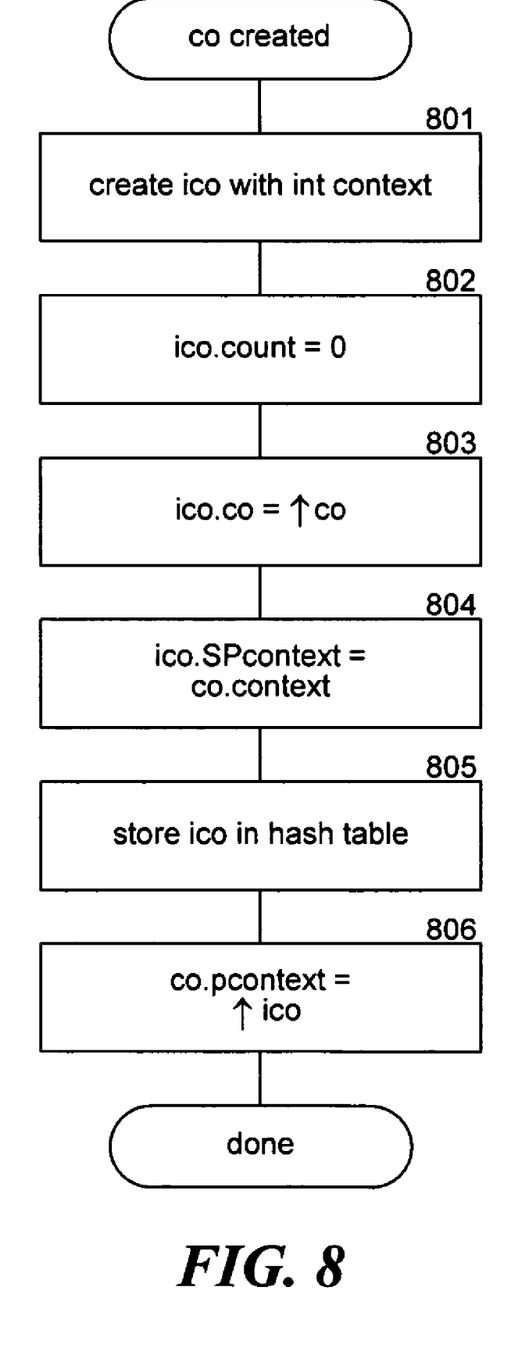
FIG. 8 is a flow diagram that illustrates processing of the context object created component in one embodiment.

FIG. 8 is a flow diagram that illustrates processing of the context object created component in one embodiment. The component is invoked when the interceptor receives a newly created context object. In block 801, the component creates an interceptor context object that contains a reference to the interceptor's context information. In block 802, the component initializes the count field of the interceptor context object to zero to indicate that no requests are outstanding. In block 803, the component sets the context object pointer field of the interceptor context object to point to the context object. In block 804, the component retains the service provider context information that is being modified by storing it in the service provider context field of the interceptor context object. In block 805, the component stores the interceptor context object using a hash table and hashing on the reference to the context object. In block 806, the component modifies the context object to point to the interceptor context object and then completes.

Figure 9:
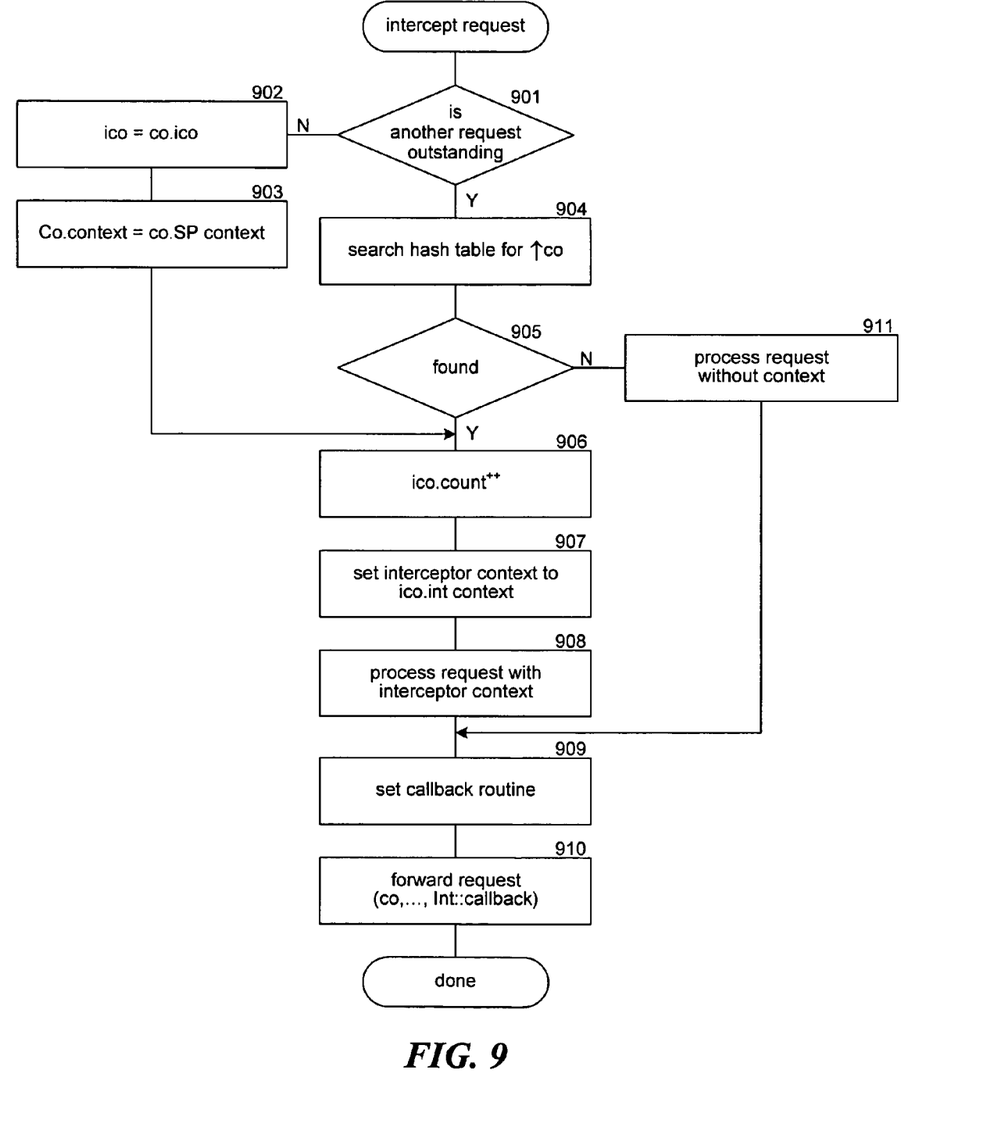
FIG. 9 is a flow diagram that illustrates the processing of the intercept request component in one embodiment.

FIG. 9 is a flow diagram that illustrates the processing of the intercept request component in one embodiment. The component is invoked by an interceptor to restore the context object. In decision block 901, if another request is outstanding, then the component continues at block 904, else the component continues at block 902. In block 902, the component retrieves the reference to the interceptor context object from the modified portion of the context object. In block 903, the component restores the service provider context object using the retained content and continues at block 906. In block 904, the component searches the hash table for the interceptor context object. In decision block 905, if the interceptor context object was found in the hash table, then the component continues at block 906, else the component continues at block 911. In block 906, the component increments the count field of the interceptor count object to indicate that one more request is outstanding. In block 907, the component sets the interceptor context to the interceptor context of the interceptor context object so that the interceptor can perform its processing in the appropriate context. In block 908, the component processes the request with the interceptor context. In block 909, the component sets the callback routine to identify the interceptor context object. In block 910, the component forwards to the service provider or the interceptor at the next lower level the request that includes the restored service provider context object and the callback function and then completes. In block 911, the component performs the processing of the request when context information is not available.

Figure 10:
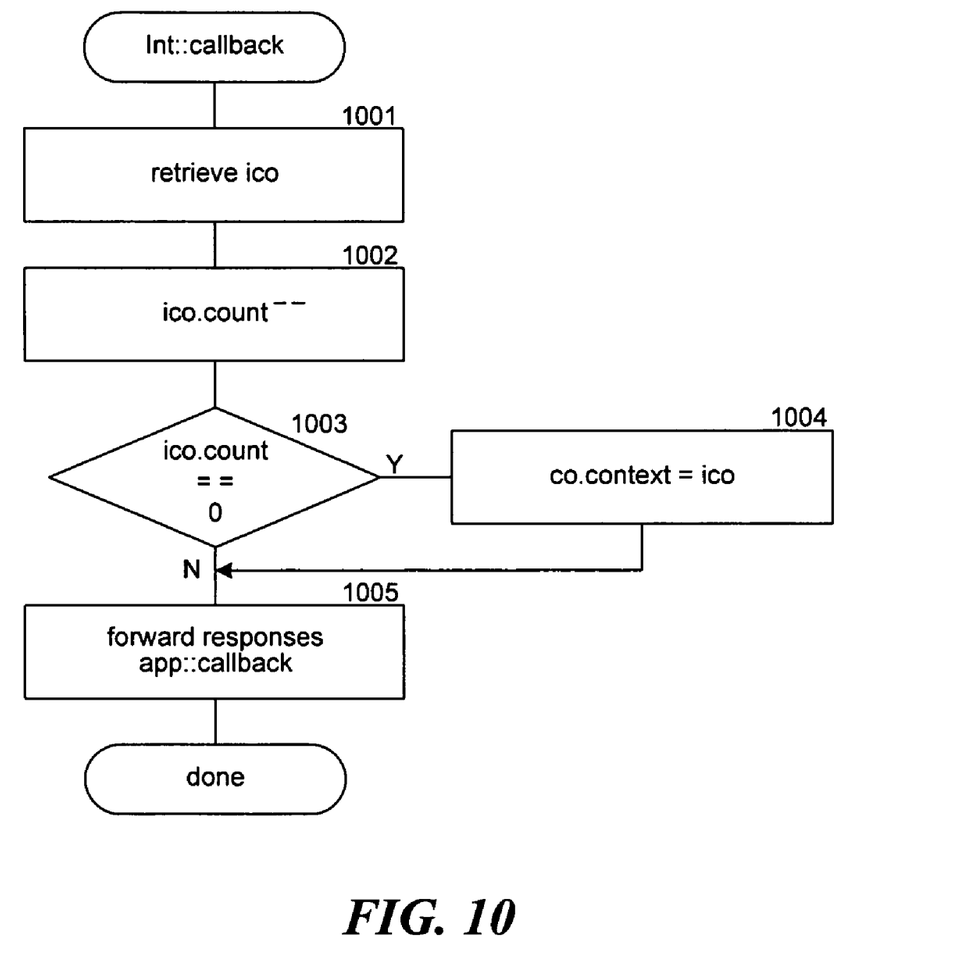
FIG. 10 is a flow diagram that illustrates the processing of the callback function in one embodiment.

FIG. 10 is a flow diagram that illustrates the processing of the callback function in one embodiment. In block 1001, the component retrieves the interceptor context object for the interceptor. In block 1002, the component decrements the count filed of the interceptor context object to indicate that one less request is outstanding. In decision block 1003, if no more requests are outstanding, then the component continues at block 1004, else the component continues at block 1005. In block 1004, the component modifies a portion of the context object to point to the interceptor context object. The component may also retain a new copy of the unmodified content in the interceptor context object if the service provider or interceptors are allowed to modify that content after creation of the context object. In block 1005, the component then forwards the response by invoking the callback function of the application and then completes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A computer-readable storage medium containing instructions for controlling interceptors to track context of a service provider, the interceptors being layered from a highest level to a lowest level interceptor between a client and the service provider, by a method comprising:

providing by the highest level interceptor to the client of the service provider modified service provider context information which has been modified to reference interceptor context information associated with the client, the service provider context information being modified by the lowest level interceptor by retaining a copy of a portion of the service provider context information prior to modification by the lowest level interceptor and replacing that portion of the service provider context information with a reference to the interceptor context information of the lowest level interceptor, the modified service provider context information provided by each interceptor except the highest level interceptor being modified by the next higher level interceptor by retaining a copy of a portion of the modified service provider context information provided by the interceptor prior to modification by that next higher level interceptor and replacing that portion of the modified service provider context information with a reference to the interceptor context information of that next higher level interceptor;

upon receiving from the client a request for a service of the service provider, for each interceptor from the highest level to the lowest level, receiving the request by the interceptor;

using modified service provider context information of the request to retrieve interceptor context information by retrieving from the modified service provider context information the reference to the interceptor context information of the interceptor and retrieving the interceptor context information referenced by the retrieved reference;

restoring the modified service provider context information to before modification by the interceptor by replacing the portion that was replaced with the retained copy; and forwarding to the next lower level interceptor or the service provider the request along with the restored service provider context information wherein the lowest level interceptor replaces the portion of the service provider context information that was replaced with the retained copy of the portion of the service provider context information; and upon receiving from the service provider a response to the request for service, modifying by each interceptor the service provider context information to reference the interceptor context information; and forwarding to the client the response along with the modified service provider context information.

2. The computer-readable storage medium of claim 1 including upon receiving from the client a request for a service of the service provider while a request for a service of that service provider is still outstanding, not modifying the service provider context information that was previously modified.

3. The computer-readable storage medium of claim 1 including upon receiving from the client a request for a service of the service provider while a request for a service of that service provider is still outstanding, using a reference to the service provider context information to locate interceptor context information.

4. The computer-readable storage medium of claim 1 including:

upon receiving from the client a request for a service of the service provider while a request for a service of that service provider is still outstanding, using a reference to the service provider context information to locate interceptor context information; and not modifying the modified service provider context information.

5. The computer-readable storage medium of claim 1 wherein the client and the service provider interact using the Transport Device Interface.

6. A method performed by a computing device for controlling interceptors to track context of a service provider, the interceptors being layered from a highest level to a lowest level interceptor between a client and the service provider, the method comprising:

providing by the highest level interceptor to the client of the service provider modified service provider context information which has been modified to reference interceptor context information associated with the client, the service provider context information being modified by the lowest level interceptor by retaining a copy of a portion of the service provider context information prior to modification by the lowest level interceptor and replacing that portion of the service provider context information with a reference to the interceptor context information of the lowest level interceptor, the modified service provider context information provided by each interceptor except the highest level interceptor being modified by the next higher level interceptor by retaining a copy of a portion of the modified service provider context information provided by the interceptor prior to modification by that next higher level interceptor and replacing that portion of the modified service provider context information with a reference to the interceptor context information of that next higher level interceptor;

upon receiving from the client a request for a service of the service provider,
for each interceptor from the highest level to the lowest level,
receiving the request by the interceptor;
using modified service provider context information of the request to retrieve interceptor context information by retrieving from the modified service provider context information the reference to the interceptor context information of the interceptor and retrieving the interceptor context information referenced by the retrieved reference;
restoring the modified service provider context information to before modification by the interceptor by replacing the portion that was replaced with the retained copy; and
forwarding to the next lower level interceptor or the service provider the request along with the restored service provider context information
wherein the lowest level interceptor replaces the portion of the service provider context information that was replaced with the retained copy of the portion of the service provider context information; and
upon receiving from the service provider a response to the request for service,
modifying by each interceptor the service provider context information to reference the interceptor context information; and
forwarding to the client the response along with the modified service provider context information.

7. The method of claim 6 including upon receiving from the client a request for a service of the service provider while a request for a service of that service provider is still outstanding, not modifying the service provider context information that was previously modified.

8. The method of claim 6 including upon receiving from the client a request for a service of the service provider while a request for a service of that service provider is still outstanding, using a reference to the service provider context information to locate interceptor context information.

9. The method of claim 6 including:
upon receiving from the client a request for a service of the service provider while a request for a service of that service provider is still outstanding,
using a reference to the service provider context information to locate interceptor context information; and
not modifying the modified service provider context information.

10. The method of claim 6 wherein the client and the service provider interact using the Transport Device Interface.

11. A computing device for controlling interceptors to track context of a service provider, the interceptors being layered from a highest level to a lowest level interceptor between a client and the service provider, comprising:
a processor; and
a memory storing computer-executable instructions of:
a component that provides by the highest level interceptor to the client of the service provider modified service provider context information which has been modified to reference interceptor context information associated with the client, the service provider context information being modified by the lowest level interceptor by retaining a copy of a portion of the service provider context information prior to modification by the lowest level interceptor and replacing that portion of the service provider context information with a reference to the interceptor context information of the lowest level interceptor, the modified service provider context information provided by each interceptor except the highest level interceptor being modified by the next higher level interceptor by retaining a copy of a portion of the modified service provider context information provided by the interceptor prior to modification by that next higher level interceptor and replacing that portion of the modified service provider context information with a reference to the interceptor context information of that next higher level interceptor;
a component that, upon receiving from the client a request for a service of the service provider,
for each interceptor from the highest level to the lowest level,
receives the request by the interceptor;
uses modified service provider context information of the request to retrieve interceptor context information by retrieving from the modified service provider context information the reference to the interceptor context information of the interceptor and retrieving the interceptor context information referenced by the retrieved reference;
restores the modified service provider context information to before modification by the interceptor by replacing the portion that was replaced with the retained copy; and
forwards to the next lower level interceptor or the service provider the request along with the restored service provider context information
wherein the lowest level interceptor replaces the portion of the service provider context information that was replaced with the retained copy of the portion of the service provider context information; and
a component that, upon receiving from the service provider a response to the request for service,
modifies by each interceptor the service provider context information to reference the interceptor context information; and
forwards to the client the response along with the modified service provider context information.

12. The computing device of claim 10 including a component that, upon receiving from the client a request for a service of the service provider while a request for a service of that service provider is still outstanding, does not modify the service provider context information that was previously modified.

13. The computing device of claim 10 including a component that, upon receiving from the client a request for a service of the service provider while a request for a service of that service provider is still outstanding, uses a reference to the service provider context information to locate interceptor context information.

14. The computing device of claim 10 including a component that, upon receiving from the client a request for a service of the service provider while a request for a service of that service provider is still outstanding,
uses a reference to the service provider context information to locate interceptor context information; and
does not modify the modified service provider context information.

15. The computing device of claim 10 wherein the client and the service provider interact using the Transport Device Interface.

* * * * *